United States Patent
Schroetel et al.

(10) Patent No.: US 9,348,874 B2
(45) Date of Patent: May 24, 2016

(54) DYNAMIC RECREATION OF MULTIDIMENSIONAL ANALYTICAL DATA

(75) Inventors: Sebastian Schroetel, Heidelberg (DE); Ulrich Bestfleisch, Schwetzingen (DE); Gerrit Simon Kazmaier, Heidelberg (DE); Nadine Sachs, Wiesloch (DE)

(73) Assignee: SAP SE, Walldorf (DE)

(*) Notice: Subject to any disclaimer, the term of this patent is extended or adjusted under 35 U.S.C. 154(b) by 843 days.

(21) Appl. No.: 13/335,938

(22) Filed: Dec. 23, 2011

(65) Prior Publication Data

US 2013/0166497 A1   Jun. 27, 2013

(51) Int. Cl.
G06F 7/00 (2006.01)
G06F 17/30 (2006.01)

(52) U.S. Cl.
CPC .................. G06F 17/30539 (2013.01)

(58) Field of Classification Search
None
See application file for complete search history.

(56) References Cited

U.S. PATENT DOCUMENTS

| | | | |
|---|---|---|---|
| 6,601,062 B1* | 7/2003 | Deshpande et al. | |
| 7,200,720 B1* | 4/2007 | Yang | G06F 17/30348 707/999.2 |
| 7,571,192 B2* | 8/2009 | Gupta et al. | |
| 7,707,143 B2* | 4/2010 | Bruce et al. | 707/999.003 |
| 7,945,575 B2* | 5/2011 | Cushing et al. | 707/760 |
| 8,359,305 B1* | 1/2013 | Burke et al. | 707/706 |
| 2004/0010502 A1* | 1/2004 | Bomfim | G06F 17/30371 |
| 2004/0139061 A1* | 7/2004 | Colossi et al. | 707/3 |
| 2004/0215626 A1* | 10/2004 | Colossi | G06F 17/30312 |
| 2005/0091237 A1* | 4/2005 | Bakalash | C03B 37/02718 |
| 2005/0131929 A1* | 6/2005 | Bailey | G06F 17/30592 |
| 2005/0159995 A1* | 7/2005 | Woehler | 705/10 |
| 2005/0187908 A1* | 8/2005 | Madan | G06F 17/3066 |
| 2006/0116975 A1* | 6/2006 | Gould et al. | 707/1 |
| 2006/0149778 A1* | 7/2006 | Clover | 707/102 |
| 2007/0078823 A1* | 4/2007 | Ravindran et al. | 707/3 |
| 2010/0161361 A1* | 6/2010 | Spears et al. | 705/7 |
| 2011/0035353 A1* | 2/2011 | Bailey | 707/602 |
| 2011/0231389 A1* | 9/2011 | Surna | G06F 17/30492 707/718 |
| 2012/0296883 A1* | 11/2012 | Ganesh | G06F 17/30315 707/693 |

* cited by examiner

*Primary Examiner* — Debbie Le
*Assistant Examiner* — Hasanul Mobin

(57) ABSTRACT

According to one aspect of systems and methods for dynamic recreation of multidimensional analytical data, lost sets of calculation scenarios that provide multidimensional analytical data results after aggregations and transformations of the multidimensional analytical data are recreated in the volatile storage of an in-memory computing engine. A multidimensional analytical data view (MDAV) compiler is triggered to read the MDAV metadata stored in an intermediate buffer in the MDAV compiler. The read MDAV metadata is compiled into a calculation scenario including calculation view metadata. The calculation view metadata is stored in the intermediate buffer. The recreated set of calculation scenarios is deployed on the in-memory computing engine.

19 Claims, 6 Drawing Sheets

DYNAMIC RECREATION OF MULTIDIMENSIONAL ANALYTICAL DATA

RELATED APPLICATIONS

This application is related to three co-pending U.S. Applications—
1. U.S. application Ser. No. 13/335,935 titled 'GENERATING A COMPILER INFRASTRUCTURE', filed on Dec. 23, 2011;
2. U.S. application Ser. No. 13/335,937 titled 'EXECUTING RUNTIME CALLBACK FUNCTIONS', filed on Dec. 23, 2011; and
3. U.S. application Ser. No. 13/335,939 titled 'GENERATING A RUNTIME FRAMEWORK', filed on Dec. 23, 2011, all of which are herein incorporated by reference in its entirety for all purposes.

FIELD

The field generally relates to the software arts, and, more specifically, to various methods and systems for dynamic recreation of multidimensional analytical data.

BACKGROUND

In computing, Online Analytical Processing (OLAP) tools enable users to interactively analyze multidimensional data from multiple perspectives. Databases configured for OLAP use a multidimensional data model that allows complex analytical and ad-hoc queries with rapid execution. Multidimensional structure can be defined as a variation of a relational model that uses multidimensional structures to organize data and express the relationships between the data. One of the mechanisms in OLAP is the use of aggregations. Aggregations are built from a fact table by changing the granularity on specific dimensions and aggregating the data along these dimensions. The number of possible aggregations is determined by every possible combination of dimension granularities. Multidimensional OLAP systems store data in optimized multi-dimensional array storage, rather than in a relational database.

Typical applications of OLAP include business reporting for sales, marketing, management reporting, business process management (BPM), budgeting and forecasting, financial reporting and similar areas. OLAP processors use data stored in in-memory databases for analytical processing. An in-memory database is a database management system that primarily relies on the main memory for computer data storage. Accessing data in volatile memory reduces the I/O reading activity when querying the data which provides faster and more predictable performance than disk memory. However, shutting down or restarting systems with in-memory databases leads to loosing the data stored in the volatile storage of the in-memory databases.

SUMMARY

Various embodiments of methods and systems for dynamic recreation of multidimensional analytical data are described herein. In various embodiments, the method includes querying an in-memory computing engine for multidimensional analytical data results obtained from executing a set of calculation scenarios by a calculation engine in the in-memory computing engine. The method further includes receiving a response from the in-memory computing engine that the set of calculation scenarios is not available in a volatile memory of the in-memory computing engine. Finally, a multidimensional analytical data view compiler is dynamically triggered to recreate the set of calculation scenarios in the in-memory computing engine.

In various embodiments, the system includes an in-memory computing engine storing a set of calculation scenarios. According to one aspect, the system includes a calculation engine inside the in-memory computing engine that executes the set of calculation scenarios. Further, an in-memory runtime is included that sends a request to the calculation engine to retrieve multidimensional analytical data results obtained from executing the set of calculation scenarios by a calculation engine. Finally, the system includes a multidimensional analytical data view compiler to recreate the set of calculation scenarios if the set of calculation scenarios is not available in the in-memory computing engine.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
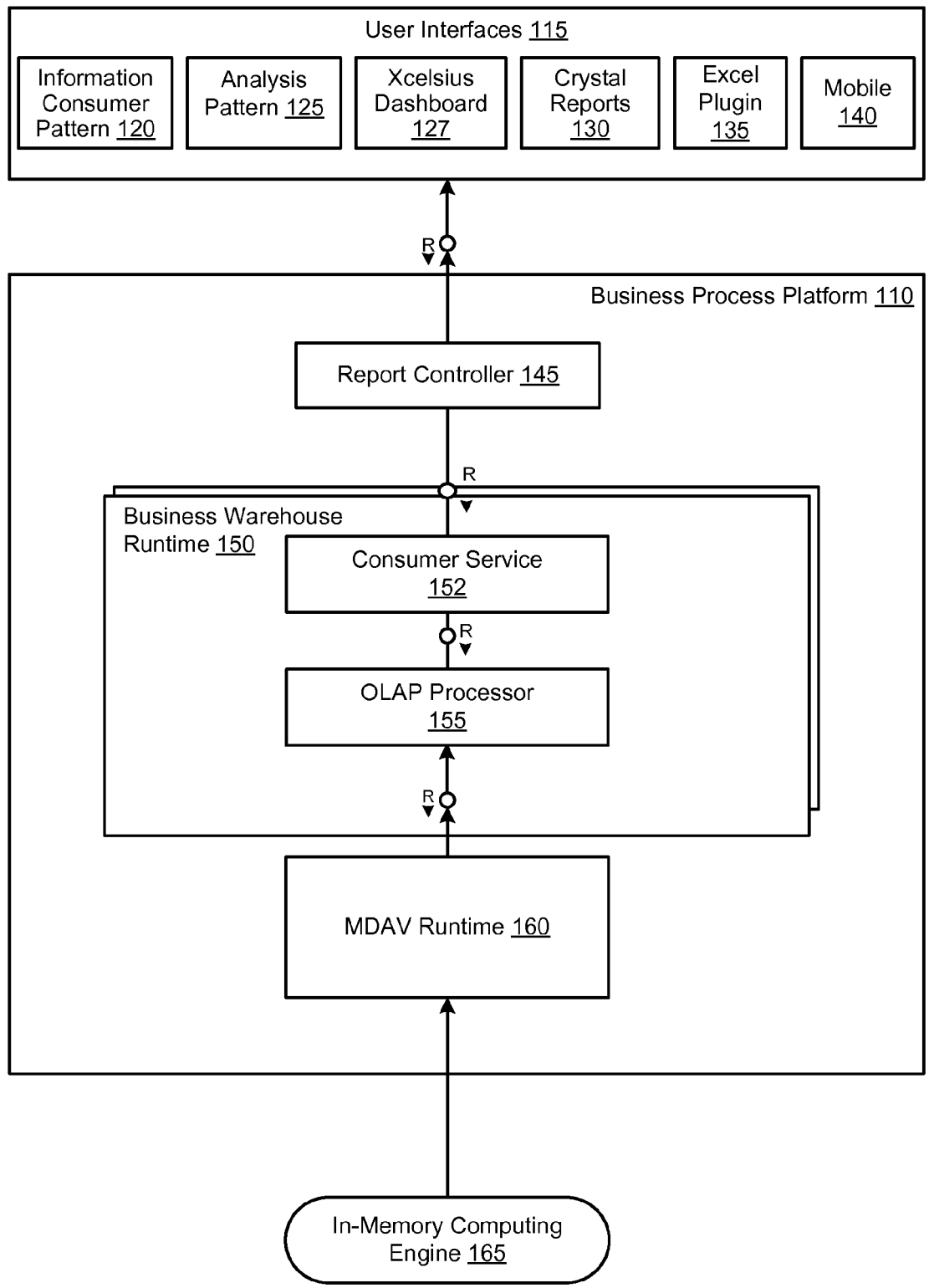
FIG. 1 is a block diagram illustrating an architectural view of the business process platform analytics runtime.

Embodiments of techniques for methods and systems for dynamic recreation of multidimensional analytical data are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment.

Furthermore, the particular features, structures, or characteristics may be combined in any suitable manner in one or more embodiment.

The multidimensional analytical data is stored in an in-memory computing engine. The in-memory computing engine is part of applications that are built using in-memory technology. These applications are built based on business driven use cases, specifically in industries requiring processing of large data volumes or real-time processing such as banking, retail, utilities/energy, and telecommunications. Examples where in-memory technology may be applied to build new applications include: 1) demand forecasting based on huge data volumes provided by smart meter devices in utilities industries; 2) managing energy cost in energy intensive industries with in-memory analytics and forecasting based on fine grained consumption data; 3) trade promotion management solutions for retailers and consumer products companies with high data volumes 4) real-time risk management (e.g., during closing of new policies) and cumulated risks calculation for insurance companies in the corresponding area; 5) internal and external risk management and regulatory reporting for banking sector; and so on.

In various embodiments, traditional business warehouse metadata is replaced with multidimensional analytical views. The multidimensional analytical views represent a business object based meta model for analytics. The analytics include computer technology, operational research, and statistics to solve different problems in business and industry scenarios such as enterprise decision management, marketing analytics, portfolio analysis, credit risk analysis, and so on. In various embodiments, business applications model their analytical data sources as multidimensional analytical views (MDAVs). The data of the multidimensional analytical views is stored in the in-memory computing engine. The MDAV metadata is internally represented as a tree structure. To execute an MDAV in a database runtime, the MDAV has to be loaded, transformed, and deployed to the desired engine (e.g., the in-memory computing engine).

FIG. 1 is a block diagram illustrating an architectural view of the business process platform analytics runtime. The business process platform 110 represents a plurality of business applications running on an application server. These business applications model their analytical data sources as multidimensional analytical views. The user interfaces 115 of the different business applications (e.g., information consumer pattern 120, analysis pattern 125, Xcelsius dashboard 127, crystal reports 130, Excel plug-in 135, mobile 140, etc.) are connected to the business process platform 110. The user interfaces 115 are connected with the business warehouse runtime 150 of the business process platform 110 via report controller 145. The report controller supports the communication between the user interfaces 115 and the backend system, i.e. business process platform 110. The business warehouse runtime 150 includes an analytical engine, an online analytical processing (OLAP) processor 155 that executes the business data (e.g., calculates the numbers for a financial report), that is accessed via consumer service 152 application programming interface. The analytical engine, e.g. the OLAP processor 155, is provided with analytical data from MDAV runtime 160—an embedded analytics framework for processing multidimensional analytical views (MDAVs). Every business application from the plurality of applications can build analytical content executed by the OLAP processor 155 (for example, year-end financial data). The MDAV runtime 160 delivers the data of the multidimensional analytical views from the in-memory computing engine 165 to the OLAP processor 155. In various embodiments, some of the data operations (such as union, join, filtering temporal data, and so on) are executed directly in the in-memory computing engine 165.

The multidimensional analytical views serve as data providers for the OLAP processor 155 as they include the analytical data. The analytical data itself is stored in the in-memory computing engine 165. As the in-memory computing engine 165 is an in-memory database system, the metadata is kept in the temporary memory (e.g., the RAM) of the engine. The MDAV runtime 160 performs some operations such as calculations and mathematical operations on the analytical data that the MDAV runtime 160 already aggregated. These operations are performed before the data is sent to the OLAP processor 155 (e.g., the analytical engine). In some embodiments, the in-memory computing engine 165 includes a calculations engine that process complex and nested calculations and data aggregation inside the in-memory computing engine runtime before retrieving the (result) data. The result from the aggregation and calculation, i.e. the aggregated data and the calculated data, is accessed by the MDAV runtime 160 via calculation views. The calculation views are also stored in the temporary memory of the in-memory computing engine 165. Therefore, when the application server is restarted or stopped (e.g., for maintenance), the calculation views could be lost as the RAM is a volatile storage.

Figure 2:
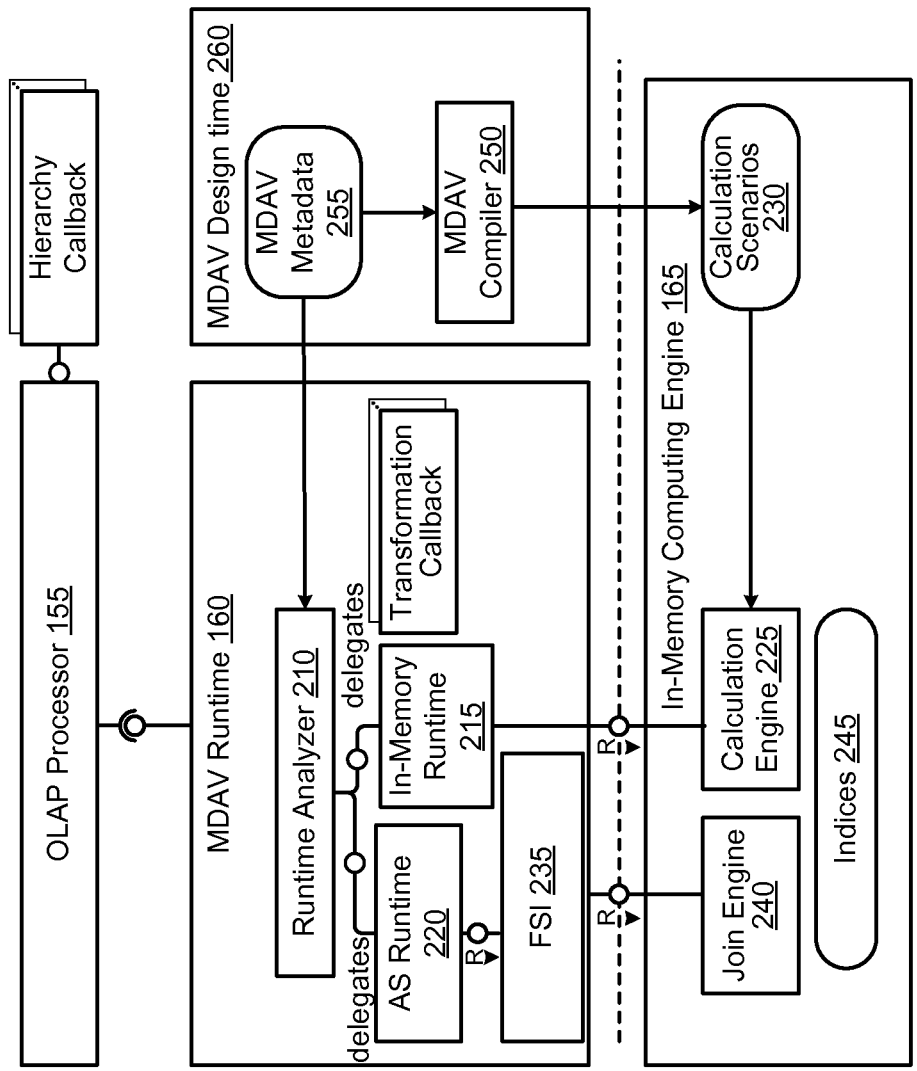
FIG. 2 is a block diagram illustrating an architectural view of the MDAV runtime.

FIG. 2 is a block diagram illustrating an architectural view of the MDAV runtime. The OLAP processor 155 receives data of the multidimensional analytical views from the in-memory computing engine 165 via the MDAV runtime 160. The MDAV runtime 160 includes runtime analyzer 210 determines which operations can be executed by the in-memory (computing engine) runtime 215 and which operations can be executed by the application server (AS) runtime 220. In various embodiments, some operations of a business scenario can be executed (e.g., calculate the analytical data) in the AS runtime 220 and some operations can be executed directly in the calculation engine 225 of the in-memory computing engine 165. The following MDAV types for analytics content are available: basic, union, intersection, virtual, and planning MDAV. Virtual MDAVs and planning MDAVs are executed by the AS runtime 220. Basic MDAVs, union MDAVs, and intersection MDAVs can be executed by the in-memory runtime 215. The decision which runtime environment should be used has to be taken during the runtime execution of a given business scenario depending on the MDAV metadata. Different parts of a MDAV can be executed within different runtime environments. Therefore, at the top of a MDAV execution, runtime analyzer 210 has to make the decision which runtime environment to be used and to delegate the call to the corresponding MDAV runtimes.

The MDAV runtime analyzer 210 determines whether the application server runtime or the in-memory runtime will execute the complete MDAV or part of the MDAV tree. Part of a more complex intersection or a union MDAV can be executed by the application server runtime while other parts can be executed with in-memory runtime. The runtime analyzer 210 provides the information about which runtime environment will execute the MDAV tree, instantiates the corresponding MDAV runtime, and delegates it to the runtime proxy for further execution. First, the runtime analyzer 210 reads the subset of the MDAV metadata from the MDAV metadata buffer. Not only is the MDAV type taken into account, but also a set of defined decision rules. These decision rules can easily be enhanced. Furthermore, the runtime analyzer 210 offers the option to overrule the generic decision by providing a parameter, which can be set and is valid for the complete MDAV tree. This option can be used for fallback mechanisms, for testing purposes, etc.

In some embodiments, the runtime analyzer 210 may decide, in correspondence with the current use case, to delegate some operations execution of MDAVs to the AS runtime 220. The AS runtime 220 is built on top of a fast search infrastructure (FSI) 235 that sends a request to the join engine 240 to access indices 245 that store the business data for executing the MDAVs.

In other embodiments, the runtime analyzer 210 delegates some operations execution of MDAVs to the in-memory runtime 215 that sends a request to calculation engine 225. When the operations are executed by the calculation engine 225 in the in-memory computing engine 165, a set of calculation scenarios 230 are created. A calculation scenario represents a list of operations (e.g., mathematical operations) that need to be executed. The result from the execution of the calculation scenarios is sent to the MDAV runtime 160, which further forwards it to the OLAP processor 155. The calculation engine 225 can work with multiple inputs from multiple table-types such as OLAP-views, JOIN-tables, physical-tables, and so on. The calculation engine 225 can combine and transform these table-types in multiple ways, for example by using predefined operations like join, projection, aggregation, etc. Further, the calculation engine 225 allows customizable operations by including Python-scripts, R-scripts, or L-scripts and thus allowing basically any kind of data transformation.

The in-memory runtime 215 sends a query to the calculation engine 225 to obtain the results from executing the calculation scenarios 230. The calculation scenarios include descriptions of the calculation operations (e.g., mathematical calculations) that should be performed inside the in-memory computing engine 165 by the calculation engine 225. In some cases, the results may not still be available in the in-memory computing engine due to, for example, a system restart. As the calculation scenarios are stored in the volatile memory (e.g., RAM) of the in-memory computing engine, when the system is shut down, the volatile memory is lost. Therefore, the calculation scenarios will also be lost. In various embodiments, MDAV compiler 250 is triggered to recreate the set of calculation scenarios 230 from the MDAV metadata 255. The first set of calculation scenarios (before the system was shut down) was also created by the MDAV compiler 250 from the MDAV metadata 255 during MDAV design time 260.

When the calculation scenarios 230 are recreated in the in-memory computing engine 165, the calculation engine 225 is notified. Thus, when the in-memory runtime 215 sends again a query to the calculation engine 225, the calculation engine 225 will retrieve the calculation scenarios 230, perform the required calculations on the operational data in the indices 245, and will return the results to the in-memory runtime 215. In this way, the methods and systems enable recreating a set of calculation scenarios in an in-memory database with a volatile storage with the purpose to derive application data, when the set of calculation scenarios no longer exist in the in-memory database. Further, there may not be needed to check in advance if the calculation scenarios 230 are available in the in-memory computing engine 165, as if they are not available, the system will automatically and dynamically recreate the calculation scenarios and redeploy them on the in-memory computing engine 165. The recreation and the redeployment of the calculation scenarios 230 is performed at runtime by invoking components such as MDAV compiler 250 that are part of MDAV design time 260.

Figure 3:
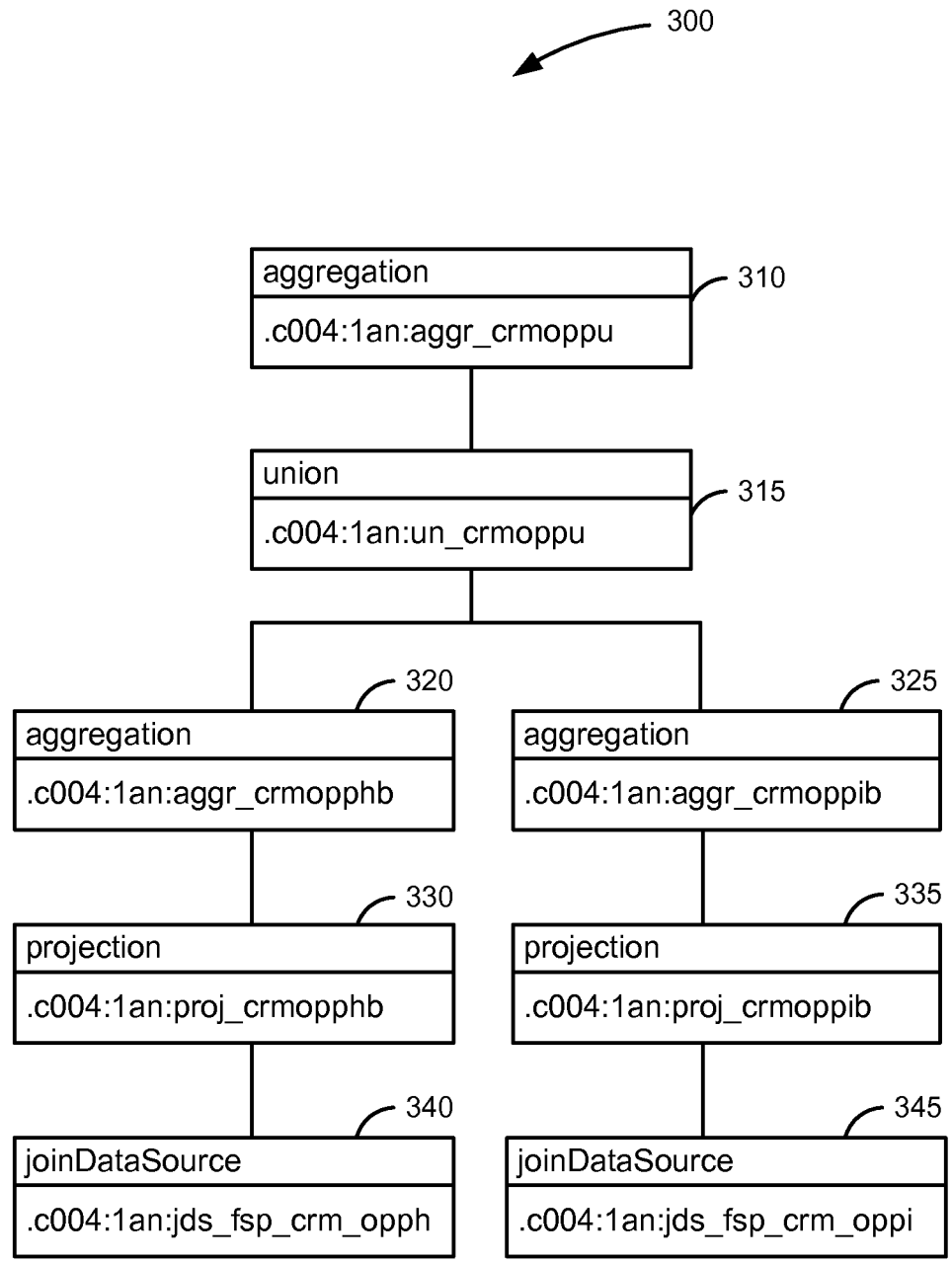
FIG. 3 is a block diagram illustrating an example of a calculation scenario.

FIG. 3 is a block diagram illustrating an example of a calculation scenario. In various embodiments, the calculation engine 225 stacks a set of calculation views for executing MDAVs. The calculation view is the elementary modeling entity of the in-memory computing engine. A calculation view always consists of a set operation (union, projection, aggregation, join) with some additional parameters. It corresponds to a database view in a normal relational database. A calculation scenario is one executable set of calculation views. Calculation views are stacked onto each other to create complex calculations. A calculation scenario is a set of calculation views that describes the calculation views and their relations. A calculation scenario has a defined root calculation view, which is the entry point of a query against the in-memory computing engine. A calculation view cannot exist by its own, it is always a part of a calculation scenario. A set of calculation scenarios that are needed to execute a whole business scenario within the in-memory computing engine define a calculation model.

The calculation view describes an operation such as an aggregation or a join operation and references one or multiple other calculation views. Available calculation views include aggregation views describing an aggregation operation, union views describing a union operation, join views describing a join operation, and projection views describing a projection operation. Calculation views are generated based on calculation models. A calculation model can be presented as a data flow graph where data sources (e.g., MDAVs) can be defined as inputs and different operations (join, aggregation, projection, etc.) can be defined on top of the data sources for different data manipulations.

A calculation model, once submitted in the in-memory computing engine 165, can be access as a database view, thus making the calculation model a configurable calculation view. The calculation views are generated by the MDAV runtime 160 based on the calculation models. After an MDAV is changed (for example, via extensibility), the corresponding calculation view will be invalidated and then newly generated the next time the MDAV is executed. Therefore, the calculation view will include all the fields of the MDAV. Since a calculation view describes an operation such as an aggregation or a join operation and references one or more other calculation views, the output of the first calculation model can be consumed as input of the next calculation model. A calculation model can be defined in XML and passed to the in-memory computing engine 165.

Calculation scenario 300 is a graph showing an exemplary calculation scenario with different calculation views for a union MDAV named "crmoppu". Calculation scenario 300 includes aggregation calculation view 310 that references union calculation view 315. Union calculation view 315 includes aggregation calculation views 320 and 325. The aggregation calculation views are derived from the MDAV metadata. The aggregation calculation views 320 and 325 reference projection calculation views 330 and 335. The projection views are used for defining filters, selection callbacks, authorizations, and so on. The projection calculation views 330 and 335 reference joinDataSource views 340 and 345 that represent FSI views. A Fast Search Infrastructure (FSI) view is a special database view in the in-memory computing engine. It is an older artifact that corresponds to a normal database join view. The FSI view is a view on several physical tables/indices that are connected via join operations. The projection calculation views 330 and 335 include all fields of the corresponding joinDataSource views 340 and 345. Calculation scenario 300 follows a calculation model, where the output of one node is referenced by another node in the model and serves as an input for that node. The input for a node has to reference other nodes in the calculation scenario by using the name of the referenced node in the name attribute. For example, aggregation calculation view 320 references projection calculation view 330 and includes that name of the projection calculation view 330, i.e. "crmopphb", in the name attribute of the aggregation calculation view 320.

Figure 4:
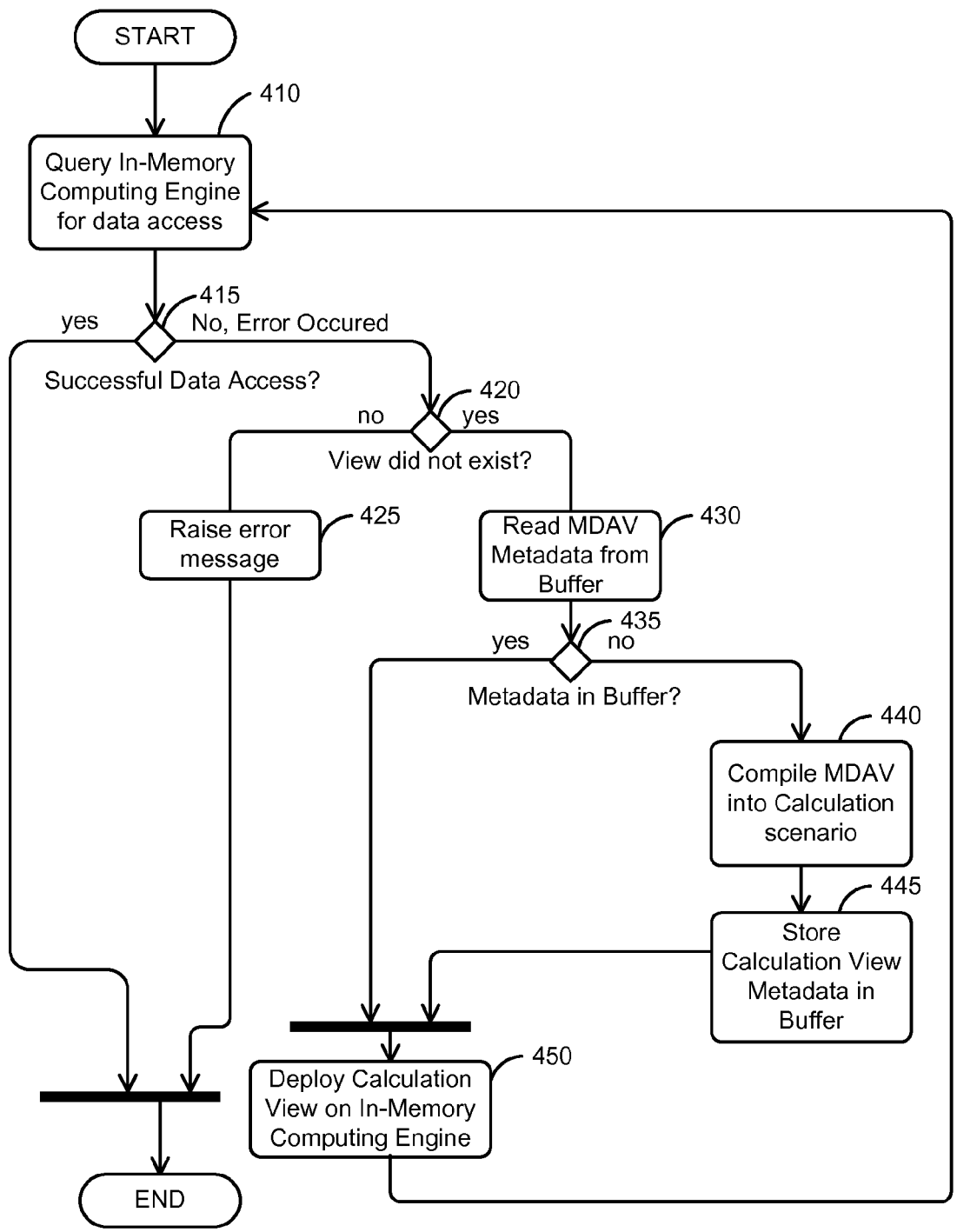
FIG. 4 is a sequence diagram illustrating a process for dynamic redeployment of calculation scenarios in in-memory computing engine.

FIG. 4 is a sequence diagram illustrating a process for dynamic redeployment of calculation scenarios in in-memory computing engine. In various embodiments, methods and systems are provided that perform dynamic redeployment of the calculation scenarios executing a set of operations on the multidimensional analytical data stored in the in-memory computing engine. At block 410, the in-memory computing engine 165 is queried for access to the operational data. The in-memory runtime 215 sends a read request to the calculation engine 225 of the in-memory computing engine 165 to read the results from the calculations performed on the operational data in the indices 245. At decision block 415, the in-memory computing engine 165 sends a response if the result from the calculation engine 225 with the operational data (multidimensional analytical data) is retrieved successfully. If the data access to the result is successful, then the result is obtained and read by the in-memory runtime 215 and the process ends. If the data access to the result is not successful, an error message is returned. At block 420, the error message is analyzed to determine if it due to some problem in the server (e.g., a technical problem) or due to a missing calculation scenario in the in-memory engine 165. If the occurred error is due to a problem in the server (or just some problem other than missing calculation scenarios in the in-memory computing engine 165), then the process continues at block 425. At block 425, an error message is raised and the process ends.

If the error is due to a missing calculation scenario or a missing calculation view, then the process continues at block 430. A calculation scenario includes one or more calculation views, where each calculation view represents an operation such as a mathematical calculation. At block 430, the MDAV metadata is read from an intermediate buffer, where it should be stored. The intermediate buffer is located inside the MDAV compiler 250. At decision block 435, it is determined if the MDAV metadata 255 is available in the intermediate buffer, where it should be stored. If the MDAV metadata is available in the intermediate buffer, then the process continues at block 450. If the MDAV metadata is not available in the intermediate buffer, then the process continues at block 440. The MDAV metadata 255 is read from the metadata repository. At block 440, the MDAV compiler 250 is triggered and the MDAV metadata is compiled into a calculation scenario. The calculation scenario is created in form of an XML-based description. At block 445, the compiled calculation scenario is stored in the intermediate buffer. At block 450, the calculation scenario is dynamically deployed on the in-memory computing engine 165. The calculation views of a scenario are recreated and thus recreating the calculation scenario in the in-memory computing engine 165. After the redeployment process is finished, the query is executed again. The process is returned at block 410. A query is sent again to the in-memory computing engine 165.

Figure 5:
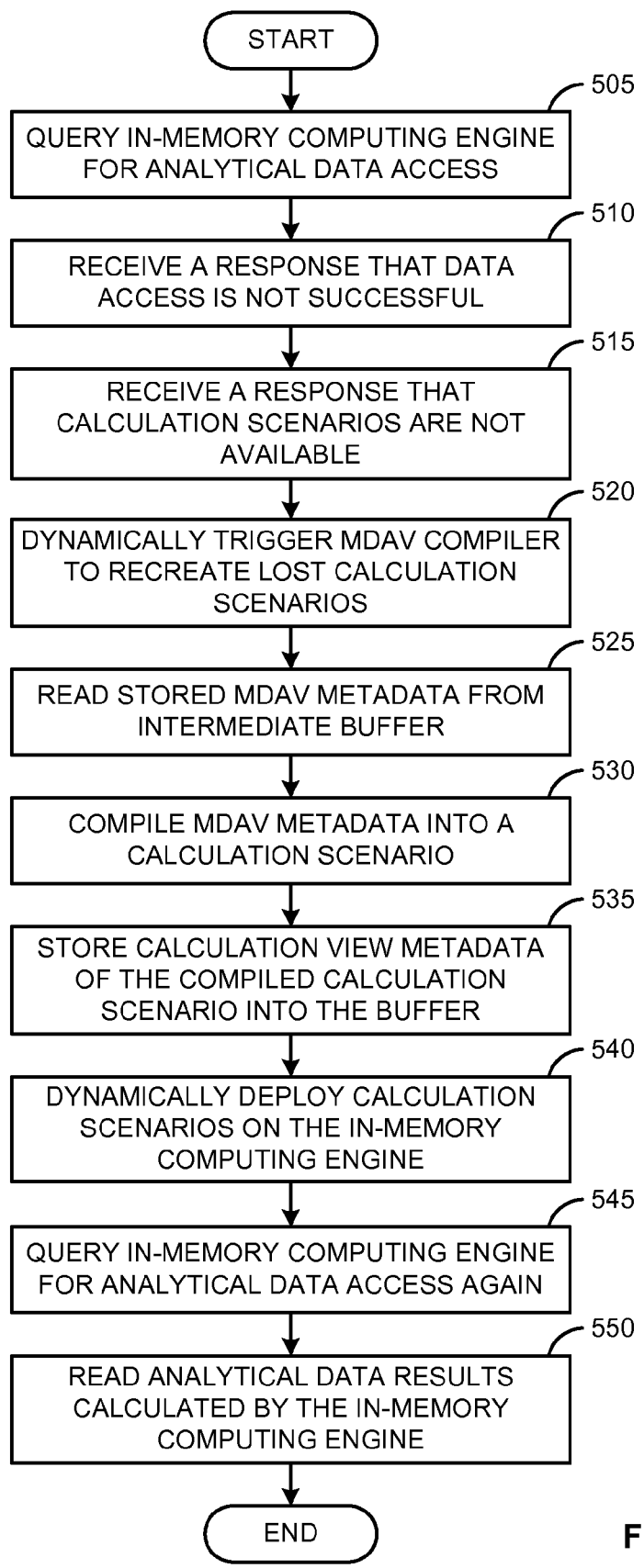
FIG. 5 is a flow diagram illustrating a method for dynamic recreation of multidimensional analytical data.

FIG. 5 is a flow diagram illustrating a method for dynamic recreation of multidimensional analytical data according to one embodiment. In various embodiments, methods and systems are presented that recreate lost sets of calculation scenarios that provide multidimensional analytical data results after aggregations and transformations of the multidimensional analytical data. The multidimensional analytical data sources are modeled as multidimensional analytical data views (MDAVs). The sets of calculation scenarios are stored in the volatile storage of an in-memory database such as the in-memory computing engine 165. A calculation scenario includes at least one calculation view that represents an operation such as a mathematical calculation operation. This operation (calculation view) will be executed on the multidimensional analytical data stored in the indices 245 of the in-memory computing engine 165. The operation will be executed directly in the in-memory computing engine 165 and the results can be read by the application server.

At block 505, the in-memory computing engine 165 is queried for access to the multidimensional analytical data results. The query is sent to the calculation engine 225 of the in-memory computing engine 165. The calculation engine 225 performs data aggregation, calculations, and transformation by executing calculation scenarios 230. The calculation scenarios 230 are defined and created at design time. The calculation scenarios 230 are stored in the volatile memory of the in-memory computing engine 165.

At block 510, a response is received from the calculation engine 225 of the in-memory computing engine 165 that the data access to the multidimensional analytical data results is not successful. An error has occurred. At block 515, a response is received from the in-memory computing engine 165 that there are no calculation scenarios available for that query. The calculation scenarios 230 may be lost as a result from a system shut down, or system restart, or some other technical reason. At block 520, the MDAV compiler is dynamically triggered at runtime to recreate the lost calculation scenarios in the in-memory computing engine 165. At block 525, the MDAV compiler is triggered to read the MDAV metadata stored in an intermediate buffer in the MDAV compiler 250. At block 530, the read MDAV metadata is compiled into a calculation scenario. At block 535, calculation view metadata of the compiled calculation scenario is stored in the intermediate buffer. At block 540, the calculation scenarios generated from the calculation view metadata are deployed on the in-memory computing engine 165. Thus, the calculation scenarios 230 are dynamically recreated in the in-memory computing engine 165. At block 545, the in-memory computing engine 165 is queried for access to the multidimensional analytical data results again. Since the calculation scenarios 230 have been recreated and are available in the in-memory computing engine 165, the data access is successful and the multidimensional analytical data results can be calculated and accessed. At block 550, the multidimensional analytical data results are read.

In various embodiments, the methods and systems for dynamic recreation (e.g., via redeployment) of multidimensional analytical data enable storing calculation views in the volatile storage of the in-memory computing engine 165 and thus saving total cost of ownership (TCO). Further the methods and systems enable redeploying the calculation views from the application server in case they are lost. Error handling process is used of the standard query access to the in-memory computing engine to trigger the redeployment procedure. Finally, calculation views metadata is stored in an intermediate buffer on the application server to allow faster redeployment of the calculation views.

In some other embodiments, the calculation scenarios can be stored in a persistent memory such as a hard disk instead of in a volatile memory. However, the calculation scenarios do not include the data itself, the calculation scenarios represent operations, calculation processes, calculation rules. Thus, via the calculation scenarios no data is stored. Therefore, if the calculation scenarios have to be stored on a file system and on the hard disk of a system additionally to the raw data that means that all business applications should be able to store their individual calculation scenarios on the hard disk, which may lead to consuming too many resources of the system, such as disk space. In addition, maintaining that amount of stored calculation scenarios could lead to extra resources, slow performance when reading from the disk, maintenance errors, and so on.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
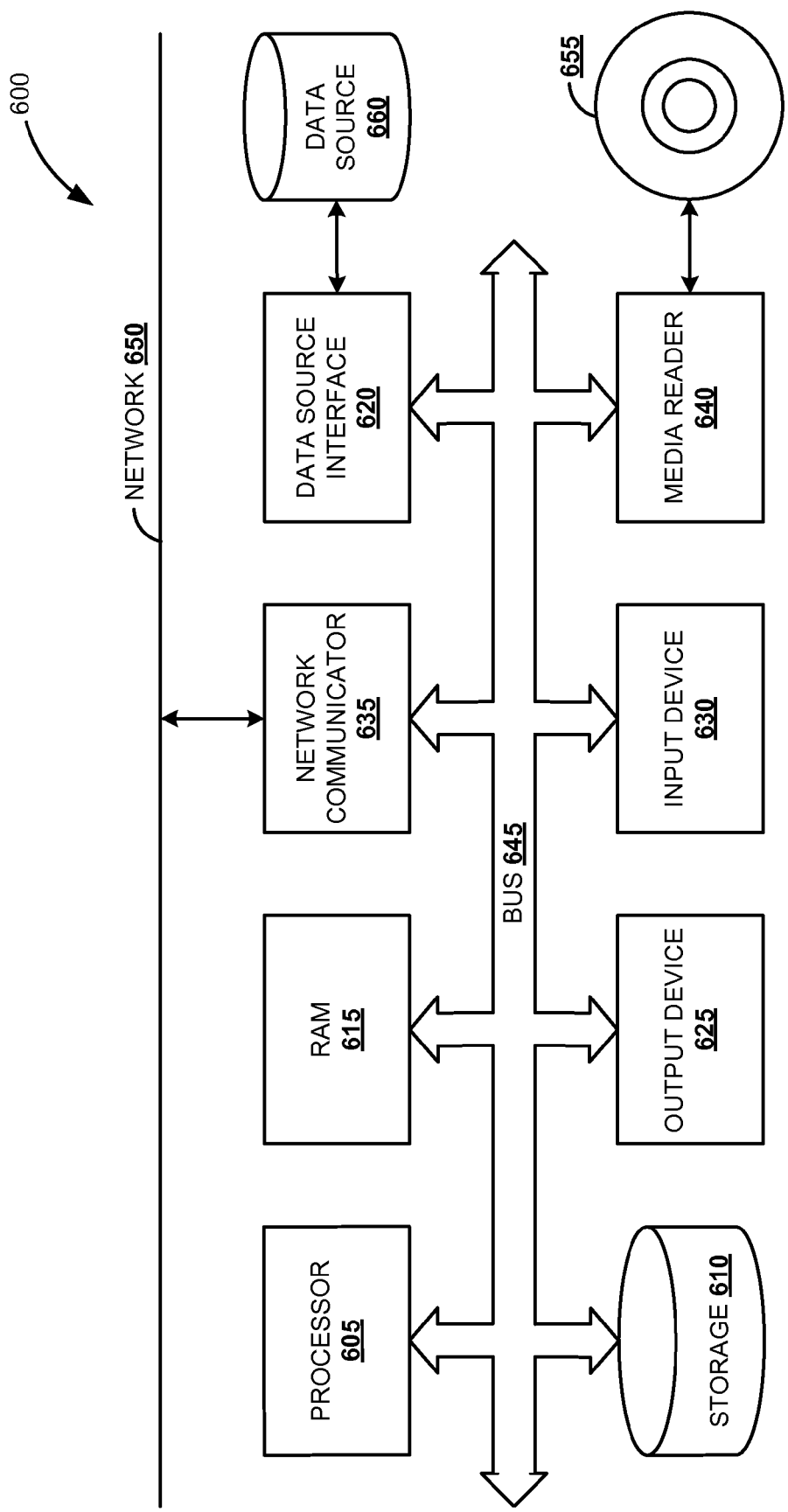
FIG. 6 is a block diagram illustrating an exemplary computer system.

FIG. 6 is a block diagram illustrating an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be access via one or more abstraction layers implemented in hardware or software. For example, the data source 660 may be access by network 650. In some embodiments the data source 660 may be accessed via an abstraction layer, such as, a semantic layer.

A data source 660 is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   query an in-memory computing engine for multidimensional analytical data results obtained from executing a set of calculation scenarios by a calculation engine in the in-memory computing engine;
   receive a response from the in-memory computing engine that the set of calculation scenarios is not available in a volatile memory of the in-memory computing engine;
   in response to the received response, dynamically trigger a multidimensional analytical data view compiler to recreate the set of calculation scenarios, wherein the multidimensional analytical data view compiler comprises an intermediate buffer that stores multidimensional analytical data view metadata;
   read the multidimensional analytical data view metadata stored in the intermediate buffer;
   compile the multidimensional analytical data view metadata into the set of calculation scenarios; and
   dynamically redeploy the set of recreated calculation scenarios in the volatile memory of the in-memory computing engine.

2. The article of manufacture of claim 1, wherein the calculation scenarios are stored in the volatile memory of the in-memory computing engine.

3. The article of manufacture of claim 1, wherein to dynamically trigger the multidimensional analytical data view compiler to recreate the set of calculation scenarios further causes the computer to:
   store calculation view metadata of the compiled set of calculation scenarios in the intermediate buffer.

4. The article of manufacture of claim 1, further comprising instructions to cause the computer to:
   read the multidimensional analytical data results obtained from executing the recreated set of calculation scenarios.

5. The article of manufacture of claim 3, wherein the calculation scenario comprises at least one calculation view, wherein the at least one calculation view comprises an operation.

6. The article of manufacture of claim 5, wherein the operation of the at least one calculation view of the calculation scenario is executed on multidimensional analytical data stored in an index in the in-memory computing engine.

7. A computer-implemented method comprising:
   querying an in-memory computing engine for multidimensional analytical data results obtained from executing a set of calculation scenarios by a calculation engine in the in-memory computing engine;
   receiving a response from the in-memory computing engine that the set of calculation scenarios is not available as a result of loss in a volatile memory of the in-memory computing engine;
   in response to the received response, dynamically triggering a multidimensional analytical data view compiler to recreate the set of calculation scenarios, wherein the multidimensional analytical data view compiler comprises an intermediate buffer that stores multidimensional analytical data view metadata;
   reading the multidimensional analytical data view metadata stored in the intermediate buffer;
   compiling the multidimensional analytical data view metadata into the set of calculation scenarios; and
   dynamically redeploying the set of recreated calculation scenarios in the volatile memory of the in-memory computing engine.

8. The method of claim 7, wherein the calculation scenarios are stored in the volatile memory of the in-memory computing engine.

9. The method of claim 7, wherein dynamically triggering the multidimensional analytical data view compiler to recreate the set of calculation scenarios further comprises:
   storing calculation view metadata of the compiled set of calculation scenarios in the intermediate buffer.

10. The method of claim 7, further comprising:
    reading the multidimensional analytical data results obtained from executing the recreated set of calculation scenarios.

11. The method of claim 9, wherein the calculation scenario comprises at least one calculation view, wherein the at least one calculation view comprises an operation.

12. The method of claim 11, wherein the operation of the at least one calculation view of the calculation scenario is executed on multidimensional analytical data stored in an index in the in-memory computing engine.

13. A system comprising:
    a computer memory to store instructions;
    a processor to execute the instructions; and
    an in-memory computing engine storing a set of calculation scenarios;
    a calculation engine inside the in-memory computing engine that executes the set of calculation scenarios;
    an in-memory runtime that sends a request to the calculation engine to retrieve multidimensional analytical data results obtained from executing the set of calculation scenarios by a calculation engine;
    a multidimensional analytical data view compiler to recreate the set of calculation scenarios upon determining that the set of calculation scenarios is not available in the in-memory computing engine, wherein the multidimensional analytical data view compiler comprises an intermediate buffer that stores multidimensional analytical data view metadata;
    read the multidimensional analytical data view metadata stored in the intermediate buffer;
    compile the multidimensional analytical data view metadata into the set of calculation scenarios; and
    the multidimensional analytical data view compiler to dynamically redeploy the set of recreated calculation scenarios in the volatile memory of the in-memory computing engine.

14. The system of claim 13, further comprising:
    an index in the in-memory computing engine that stores multidimensional analytical data used by the set of calculation scenarios.

15. The system of claim 13, wherein the multidimensional analytical data view compiler is dynamically triggered by the in-memory runtime to recreate the set of calculation scenarios.

16. The system of claim 13, wherein the multidimensional analytical data view compiler stores calculation view metadata of the compiled set of calculation scenarios in the intermediate buffer.

17. The system of claim 16, wherein the calculation scenario from the set of calculation scenarios comprises at least one calculation view, wherein the at least one calculation view comprises an operation.

18. The system of claim 17, wherein the operation of the at least one calculation view of the calculation scenario is executed on the multidimensional analytical data stored in the index in the in-memory computing engine.

19. The system of claim 13, further comprising:
 read the multidimensional analytical data results obtained from executing the recreated set of calculation.

* * * * *